United States Patent [19]
Parker

[11] Patent Number: 5,661,791
[45] Date of Patent: Aug. 26, 1997

[54] METHOD AND APPARATUS FOR ENHANCED DISTINCTIVE CALL REDIRECTION

[75] Inventor: Alita M. Parker, Lanham, Md.

[73] Assignee: Bell Atlantic Network Services, Inc., Arlington, Va.

[21] Appl. No.: 413,863

[22] Filed: Mar. 29, 1995

[51] Int. Cl.⁶ .................................................. H04M 3/42
[52] U.S. Cl. ........................ 379/211; 379/201; 379/207; 379/252; 379/373
[58] Field of Search ...................... 379/201, 207, 379/210, 211, 212, 127, 142, 196, 93, 94, 95, 221, 220, 219, 204, 203, 202, 246, 252, 373, 375

[56] References Cited

U.S. PATENT DOCUMENTS

| | | | |
|---|---|---|---|
| 4,191,860 | 3/1980 | Weber | 379/115 |
| 4,266,098 | 5/1981 | Novak | 379/142 |
| 4,310,727 | 1/1982 | Lawser | 379/207 |
| 4,313,035 | 1/1982 | Jordan et al. | 379/207 |
| 4,757,267 | 7/1988 | Riskin | 379/113 |
| 4,893,336 | 1/1990 | Wuthnow | 379/211 |
| 5,136,636 | 8/1992 | Wegrzynowicz | 379/207 |
| 5,181,238 | 1/1993 | Medamana et al. | 379/196 |
| 5,199,062 | 3/1993 | Von Meister et al. | 379/211 |
| 5,243,645 | 9/1993 | Bissell et al. | 379/211 |
| 5,247,571 | 9/1993 | Kay et al. | 379/207 |
| 5,311,572 | 5/1994 | Friedes et al. | 379/67 |
| 5,329,578 | 7/1994 | Brennan et al. | 379/211 |
| 5,384,831 | 1/1995 | Creswell et al. | 379/211 |
| 5,392,342 | 2/1995 | Rosenthal | 379/211 |
| 5,408,528 | 4/1995 | Carlson et al. | 379/211 |
| 5,430,791 | 7/1995 | Feit et al. | 379/211 |
| 5,440,620 | 8/1995 | Slusky | 379/211 |
| 5,467,388 | 11/1995 | Redd, Jr. et al. | 379/207 |
| 5,481,603 | 1/1996 | Gutierrez et al. | 379/127 |
| 5,497,414 | 3/1996 | Bartholomew | 379/201 |

Primary Examiner—Krista M. Zele
Assistant Examiner—Scott Wolinsky
Attorney, Agent, or Firm—Lowe, Price, LeBlanc & Becker

[57] ABSTRACT

Telephone communications systems and methods are provided enabling subscribers to establish an easily changed plan for call completion, over an Advanced Intelligent Network to any of several alternative locations, of calls dialed to a single directory number. A call to the same directory number by an authorized caller can enable the caller immediately to update the call completion plan dependent on the caller's status. A distinctive ringing signal is applied on a per-call basis to calls completed under the call completion plan. The call completion plan is maintained as a part of a call processing record at an ISCP.

23 Claims, 7 Drawing Sheets

| AUTHORIZED DN NUMBER | STATUS A/C | GEOGRAPHIC LOCATION (N/S/E/W) | ACTIVE (Y/N) |
|---|---|---|---|
| 301-300-2010 | A | N | Y |
| 202-500-6678 | C | E | Y |
| 703-600-1550 | C | W | Y |
| 703-600-7766 | A | W | N |
| ⋮ | ⋮ | ⋮ | ⋮ |
| 301-303-2506 | C | N | N |

Figure 2

METHOD AND APPARATUS FOR ENHANCED DISTINCTIVE CALL REDIRECTION

CROSS-REFERENCES TO RELATED APPLICATIONS

This application is related to copending application Ser. No. 08/388,058, (Attorney docket number 680-101), filed Feb. 10, 1995, entitled "Method and Apparatus for Routing Calls Placed to a Virtual Telephone Number," by Eric Voit commonly assigned with the present invention.

TECHNICAL FIELD

The present invention relates generally to redirecting telephone calls dialed to a particular telephone number to one of a plurality of specified telephone directory number locations with distinctive ringing and more particularly for enabling, to predetermined varying degrees, parties at the specified locations to control the routing of such calls.

BACKGROUND ART

A practice now common in the telephone industry is to provide a subscriber, typically a business or commercial entity, with a single telephone number to serve diverse geographical areas or territories. Calls placed to that number are routed to respondents who are appointed to serve the respective areas from which the calls originate. While the terminology may differ, depending on the exact context, the single telephone number is sometimes referred to as a "virtual" number since it represents no telephone station in particular, but rather is the calling number for a plurality of stations, each of which may have its own actual directory number.

Virtual numbers have been used in a long-distance context whereby a single number is promoted on a large scale, typically nation-wide, and calls to the number are carried by an inter-exchange, or long distance carrier. The number for these wide area services is usually a special service access number such as an 800 or 900 number, depending on whether the called party or the caller is to be responsible for the call charges. The prior art is predominantly directed to handling calls received on a wide area basis and from areas whose boundaries are rather static and predefined.

A patent to Weber, U.S. Pat. No. 4,191,860, for example, discloses a system whereby a caller dials an 800 number, which, along with the caller's area code (i.e., the NPA, or numbering plan area code), is then used to access a translation table stored in a database system and retrieve an ordinary telephone number to which the call is consequently routed. This is the so-called WATS to POTS translation (Wide Area Telephone Service to Plain Old Telephone Service), now widely deployed by interexchange carriers in a variety of forms. Since the NPA is indicative of a certain geographical area from which the call originates, the translation can be made to yield a POTS number for a party who is especially suited to respond to calls that originate from that area. Thus, callers from different areas, as determined from their area codes, may be routed differently. This arrangement is adequate only if all calls from the same area code are to be routed to the same destination.

Another patent, U.S. Pat. No. 4,757,267, to Riskin, discloses a system that directs an 800 call, with dialed digits that uniquely identify a product or service, to a dealer in those goods or services who is located in some proximity to the calling station. From knowledge of the originating telephone number the call is first routed to a service company in the general vicinity of the caller. Once the nearest dealer is determined, that dealer's telephone number is dialed automatically.

Riskin suggests use of a database according to the Weber model whereby that database, upon being queried with the 800 number and the NPA, sets up a call to another database, providing to it the dialed 800 number and the calling station's NPA and exchange code. The second database system determines the nearest dealer and the POTS number is returned through the facilities associated with the first database for call completion. The focus of the Riskin patent is on getting the long distance caller to the dealer who happens to be closest even though that dealer may not be the dealer assigned to a predefined territory.

A patent to Wegrzynowicz, U.S. Pat. No. 5,136,636, also routes calls to local dealers by building upon the use of a Weber type of database. In operation, a caller dials the virtual 800 number, and a primary database is accessed using the NPA of the caller and the 800 number; the output of the primary database is a number that identifies one of a plurality of secondary databases for a customer, and a key identifying the customer, for access. That information is then returned from the database, through the associated signaling system, to a network screening office. A translation is made to determine which secondary database of the customer to access. The access key plus the first six digits of the caller's directory number or the entire number is then cross-referenced to a local dealer telephone number, which is returned to the switching system of the network for call routing. The patent expressly recognizes that, only under special circumstances are these techniques applicable for intra-LATA or local services.

U.S. Pat. No. 5,311,572 to Friedes et al., describes a system for processing a database-queried call and uses the call processing capabilities of a carrier's database and a subscriber's database as part of the total communication switching system. The carrier's database is a routing database. The subscriber's database contains calling party identification information including background of the caller. Origination information is forwarded by the originating switch to the carrier's database, which sends it to the subscriber's database. The subscriber's data base uses pre-stored programs and caller's related information to formulate a processing label for the call. The processing label is comprised of a routing label to select a destination number for the call and an end point label which includes information to be passed to the subscriber's premise equipment. A billing information label is also provided.

U.S. Pat. No. 4,313,035 to Jordan et al., describes the use of an intelligent network to provide a person locator service through multiple exchanges of the switched telephone network. The system provides subscriber access to the subscriber's data in the central data base of the intelligent network, to input data for controlling the person locator service. Each subscriber to the locator service has a unique person locator telephone number. To access the system to update data in the data base, the subscriber dials 0700 and his unique person locator telephone number. The telephone switching office routes the call to a traffic service position system (TSPS), which prompts the caller to receive further digits from the subscriber. The subscriber inputs a three digit access code, indicating the type of update call, and a four digit personal identification number. If calling from the remote station to which the subscriber wishes his calls routed, the local switching office forwards the line identification number of that station to the TSPS. The TSPS forwards the dialed information and the line identification to the data base for updating the particular subscriber's location record.

An absent subscriber can input a number to which calls are to be completed, such as the number where the subscriber can be reached, into the central data base. A caller wishing to reach the subscriber dials the subscriber's unique person locator number. A telephone switching office having access to CCIS sends the dialed number to the central data base. The data base retrieves the stored completion number for the called subscriber and forwards that number back to the switching office to complete the call.

Copending application Ser. No. 08/388,058 (680-101), identified earlier and hereby incorporated by reference, recognizes the need for techniques to facilitate somewhat more localized virtual number usage and that are particularly adaptable to prescribe call routing from territories whose boundaries are subject to change from time to time. Such needs are expressed by example of a local business having several geographically separated branches that serve call-in customers. A call directed to a single virtual number is routed to an appropriate branch on the basis of geographical location of the calling party, through use of the AIN network and the public switched telephone network. The AIN system is described in detail in U.S. Pat. No. 5,247,571 to Kay and McConnell, the disclosure of which is incorporated herein by reference. Each call to the virtual number initiates access to the ISCP database to obtain information from the associated customer processing record to complete the call to the appropriate destination branch.

In addition to the functionality provided by the systems described in the prior art, as well as that of the copending application, a need exists for providing extended flexibility to subscribers subject to call redirection. The subscriber, for example, may operate from a single location at certain hours while requiring redirection of calls dialed to the directory number of the location to other destinations during off hours. In such event, the dialed number is not a virtual number as it is the actual directory number of the on hours location.

In many instances the subscriber may not be a business entity that has a relatively constant complement of branch locations. The number of stations that are available to receive calls and the identity of such stations are parameters that may be variable over time. The ability more easily to designate and change call redirection destinations and to schedule assignments more quickly than currently available are highly desirable features.

By way of example, a "hotline" service environment would benefit greatly from such flexibility. Such service would provide telephone counseling to patients, for example persons going through addiction withdrawal, at any time regardless of whether a counselor is physically present at a counseling center. A single "hotline" telephone number would be published. In off hours, when the center is not staffed, calls dialed to the published hotline number are connected to an available counselor "on call" and located near the caller.

Counselors may be professionally employed and/or volunteers, such as recovered addicts. Redirected calls in most cases would be connected to counselors' residences. It would be important to identify whether or not incoming calls are "hotline" calls, considering their sensitive nature. With provision of such identification, parties other than the counselor at the destination location would be aware not to answer. Such identification would only be necessary during "on call" periods. While telephone companies provide a service known under a variety of names such as "IdentaRing$^{SM}$" to provide a different ringing signal to a line depending on which of a plurality of line assigned directory numbers is dialed, such service would not sufficiently meet the needs of a "hotline" counselor.

The currently available distinctive ringing services are more fully described in copending application, Ser. No. 07/936,455, filed Aug. 28, 1992. In summary, multiple directory numbers are assigned to a subscriber line. The telephone central office switch connected to that line will applying a distinctive ringing signal to incoming calls for each assigned directory number to produce different audible rings at the subscriber's premises. For a call dialed to the subscriber's main number, the local telephone office switch identifies that number to apply a standard ringing signal (two seconds on, four seconds off) to the called subscriber's line. If a call is dialed to a second assigned number, the local telephone office switch identifies the number and applies a different ringing signal to the line.

The "IdentaRing$^{SM}$" type service functionality is set in the central office switch when the service is initiated and the multiple directory numbers are assigned. The service remains constantly in effect until terminated. There is no provision of the multiple distinctive ringing feature to a line that is assigned a single directory number, or for selective application of a distinctive ringing signal only for redirected calls, such as would be useful in the "hotline" environment.

A "hotline" service is likely to include volunteer or nonprofessional counselors as well as professional administrators. With respect to setting workload schedules, administrators are delegated widespread functions, such as authorization of counselors and administrators, activation of any of the authorized individuals for accepting counseling calls, and deauthorization of such individuals. The counselor's scheduling functions are more limited to activation or deactivation of the individual counselor for a counseling call. Current telephone services do not provide automated fulfillment of these functions in response to input by the respective individuals.

DISCLOSURE OF THE INVENTION

Advantages of the present invention include enabling subscribers to establish an easily changed plan for completion to any of several alternative locations of calls dialed to a subscriber's single directory number. In accordance with the invention, a call to the same directory member by an authorized caller can enable the caller immediately to update the call completion plan to an extent that is dependent on the caller's status. A further advantage of the invention is the temporary application, on a per-call basis, of a distinctive ringing signal to calls completed under the call completion plan.

These and other advantages of the invention are satisfied, at least in part, through the use of the Advanced Intelligent Network (AIN) Platform. A detailed description of an AIN system, suitable for implementation in connection with the present invention, is provided in U.S. Pat. No. 5,247,571 to Kay and McConnell, the disclosure of which is incorporated herein by reference.

In the "hotline service" example, the AIN network permits convenient remote administration of the hotline through the authorized use of the same hotline number that is provided for counseling calls. The hotline number may be an actual number used for receiving calls at a service location during working hours or a virtual number that is always used for routing calls elsewhere. An 800 number or 7 to 10 digit number can be established for the hotline number. In response to the dialing of that number by an end user, the system routes a call to the nearest counselor or administrator acting in a counselor capacity. The destination is determined by accessing the AIN network Service Control Point (SCP) database for the applicable call processing record (CPR). The ISCP associates a distinctive ringing signal instruction with the call. The system has the ability to set queues for handling heavycall traffic and distributing calls among available counselors.

Counselors, who may be based in their own homes, can be activated and deactivated through their own initiated calls or by calls placed by administrators to the same hotline number. The actual telephone directory numbers at which the counselors can be reached are entered by the counselors during the registration process. By dialing the same hotline number, administrators also can activate or deactivate themselves for counseling incoming calls, add new counselor authorizations and remove existing counselor authorizations.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 2 is a table illustrating a call processing record (CPR) developed in accordance with the invention.

BEST MODE FOR CARRYING OUT THE INVENTION

The AIN network makes advantageous use of common channel signaling for providing a redirected signal path prior to voice line connection between the originating caller and the redirected destination. Common channel signaling uses an out of band signaling path that is separate from the path used for voice transmission. This signalling technology provides for faster call set-up times and a more efficient use of the voice network than prior manual signaling, dial pulse signaling or multifrequency signaling schemes wherein the trunk connecting the calling and the called subscribers required both signaling and voice transmission over the same circuitry. When a call is placed, the voice communication is suspended while signaling is transmitted through the common channel signaling network to check whether the line at the destination switch is busy and to determine the voice connection path.

Figure 1:
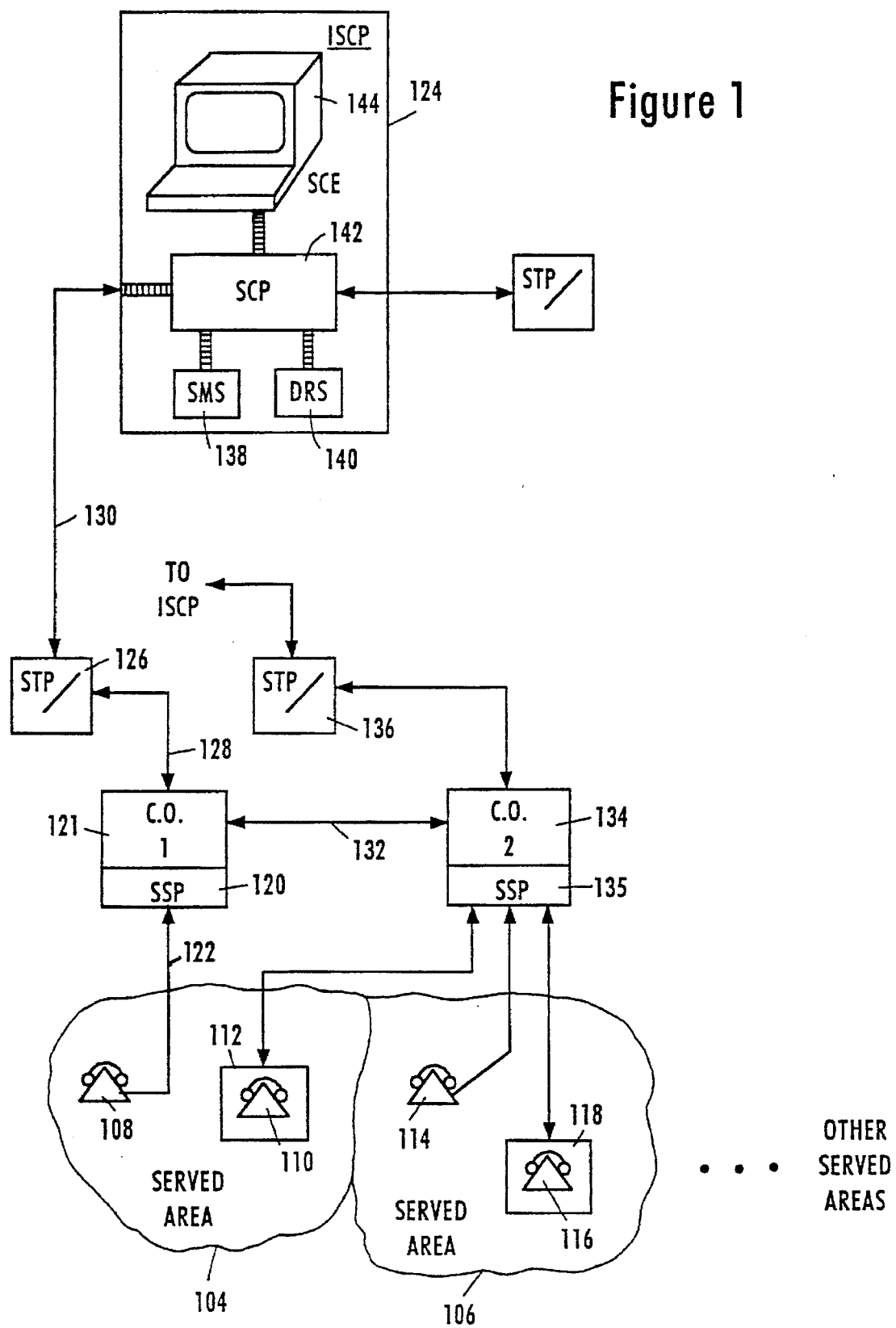
FIG. 1 is a schematic block diagram of the components of an Advanced Intelligent Network system according to the invention.

FIG. 1 is a block diagram of a telephone system, including components of an advanced intelligent network that is simplified for explanation purposes. The full network and operating environment for the invention may comprise multiple central offices, diverse interconnections, and provisions for reliability through redundancy, all of which need not be shown for developing an understanding of the invention.

Explanation of the preferred embodiment is presented in the context of a hotline service environment. It is to be understood that such environment is for illustration purposes and that the system is applicable to other subscriber applications.

As illustrated, the subscriber serves various territories, including contiguous served areas 104, 106, and others as indicated. All of the served areas, taken together, may cover some broad geopolitical area such as a city or county, or they may cover the combination, for example, of a city and county, or some more extensive area. The served areas need not be contiguous, however, and there may be served areas which are isolated from others. Generally, a call placed to the subscriber's hotline telephone number from telephone 108, for example, located in served area 104, will be routed to a counselor's telephone 110 at location 112 which is also located in area 104; similarly, a call to the hotline number from calling station 114, located in area 106, will be routed to the telephone at location 116, which also happens to be in the same served area 106 as the calling station 114. Calls arising in other served areas of the subscriber similarly will be routed to appropriate active counselors. If there is no active counselor in the same territory as the calling station, the call will be routed to an active counselor from another served area.

A call to the hotline number from telephone 108 begins with a party at the calling station 108 dialing that number. The virtual number may be the usual 7-digit telephone number, a full 10-digit number including the three NPA digits, or an 800 number. An SSP switching means 120 located in a first central office 121 receives the dialed digits by way of the local loop 122. The SSP 120, programmed to recognize the hotline number as an action trigger requiring AIN direction for routing, momentarily suspends processing of the call and formulates a query message for that purpose to be sent to the ISCP 124. The query message format and the means of its conveyance to the ISCP 124 are as described in the Kay patent, but for present purposes it will include the called number and an indication, such as the automatic number identification (ANI), of the calling station's number.

The ISCP 124, is comprised of a service management system (SMS) 138, a data and reporting system (DRS) 140, a service control point (SCP) 142, and a service creation environment (SCE) 144, as described in the Kay patent. The SCE 144 provides a gateway for initial entry and updating of data pertinent to call routing in accordance with the invention. For what may be regarded as typical AIN applications, the ISCP 124 provides a complete system for carrying out the function of those applications. However, access is available to peripheral devices.

The message signaling pathway to the ISCP 124 is part of a common channel signalling network portion and connects by way of STP 126, connected on one side by data link 128 to the central office 121, and on the other side to ISCP 124 by data link 130. The ISCP 124, in conjunction with peripheral databases, is operative, to determine from the called hotline number and the calling station's ANI, the actual phone number of telephone 110. Once determined, that number is returned in an appropriately formatted routing message, by way of STP 126, to the SSP 120 of central office 121. Upon receipt of the routing message, the SSP 120 resumes call processing for the call and it is routed, in this case, via trunking system 132 or voice network portion, to a second central office 134 that serves telephone 110 to complete the call thereto. The ISCP will direct such call completion routing if the directory number of the calling station 108 is not an authorized client or administrator. The routing message includes a message for the serving central office 134 to transmit a distinctive ringing signal to station 110 upon connection of the call.

By similar processing, a call originating at telephone 114 in the subscriber's territory 106 can be routed to the telephone 116 that is served by the same central office 134. In this latter case, however, since the call is both originated and terminated by the second central office 134 there is no routing from one central office to another. Nevertheless, the ISCP 124 is queried for routing instructions. The second central office 134 also includes an SSP 135 and has access to the ISCP 124 through an STP 136 and associated data links. As will also be recognized by those of ordinary skill in the art, in the event a call is routed from one central office to another, the ISCP 124 may be queried for routing instructions by either the originating or the terminating SSP.

The ISCP provides routing instructions in accordance with information stored in the call processing record (CPR) associated with the hotline number in its database. An example CPR table is shown in FIG. 2. The table lists authorized counselors and administrators. Associated information is provided that identifies whether the individual is a counselor or administrator, whether the individual presently is active or inactive, the individual's directory number, and the geographical area in which the individual is located. The CPR also contains a general indication of distinctive ringing signaling for calls to be completed to the listed numbers. Alternatively, an additional column in the list can be provided to indicate individually whether distinctive ringing signalling is to be provided for the associated number.

The CPR easily may be changed and updated by a call to the hotline number from one of the listed authorized numbers. The extent to which change is permissible is dependent on the status category of the incoming caller. Counselors have the limited ability to activate or deactivate themselves for accepting hotline calls. Administrators have the additional ability to activate or deactivate any of the listed numbers, as well as to add or delete authorized numbers to/from the CPR listing. Thus, the ISCP is responsive to calls to the one hotline number to both instruct completion of calls in accordance with stored information, with a distinctive ringing signaling on a per-call basis, and to change, to a varying extent, the information stored in the database CPR.

Operation of the system can be understood in more detail with reference to the flow charts of FIGS. 3A–3D. A phone call is initiated by an off hook condition and input of dialed digits by the caller, as indicated by S10 in FIG. 3A. The central office switching system associated with the calling subscriber line receives the digits, at S12, and determines whether a called party directory number trigger corresponds to the dialed number, S14. If no trigger has been set, the call is routed and completed to the dialed number destination in normal fashion, S16.

If the central office switching system detects a trigger, processing of the call is temporarily suspended. The calling line directory number is identified from the ANI information, S20, and a TCAP message is formulated and transmitted over the common channeling signaling network to the ISCP, S22. The message includes both the dialed hotline number and the calling line directory number. The ISCP accesses the call processing record (CPR) assigned to the hotline, S24, to determine how the call should be handled. The CPR is first checked to determine whether the CPR contains a directory number (DN), S26. If no DNs are listed, the call is completed to a default directory number. Such a situation can exist, for example, if the hotline number is an actual number in use at a hotline center with no current plan for call redirection. The call would then be completed to the dialed, active number, or a default number such as a voice mail destination.

In the more likely event that the CPR contains one or more DNs, a determination is made of whether the calling directory number matches a stored CPR DN, S30. The absence of a match indicates that the caller is not an administrator or counselor and is, therefore, assumed to be a hotline "client" seeking counseling. From the NPA of the calling directory number, the ISCP determines the geographical area from which the call was placed, S32. The CPR is examined to determine whether there is an available active counselor or administrator in the prescribed area to whom the call can be routed, S34. If none exists, the CPR is examined for available active counselors or administrators from other geographical areas, S36. A destination directory for the call is then determined from the active counselors and administrators, S38, an individual from the same area as the caller being preferable. The extent and boundaries of the geographical areas are prescribed at the hotline subscriber's discretion. Reference is made to the aforementioned copending application (Docket 680-101) for a detailed discussion of development of geographical plans. The particular manner in which the prescribed area boundaries are formulated is not of particular importance in the present invention.

Having determined a DN destination for the call at S38, the ISCP formulates messaging to be transmitted over the common channel signaling network, via appropriate STPs to the central office switching system(s) for routing and completion of the call, S40. Included are instructions for the terminated central office switching system to apply a distinctive ringing signal for the current call. Such instructions can be given automatically for every call routed to an administrator of counselor as prescribed by the ISCP or given in response to an indication in the CPR for the particular individual that is to receive the call. The ringing signal will be different from the normal ringing signal transmitted with calls dialed to the destination DN. The call is routed to the destination at S42.

If there are no available active counselors or administrators, a determination is made of whether the call can be placed in a queue to wait for the next available counselor, S44. If so, the call is placed in the queue, S46. Whether or not the call is placed in a queue, an appropriate message will be transmitted to the caller that counselors are not currently available, S48. Optionally, an interactive menu can be sent that presents options that may include queuing the call, connection with an emergency number or an operator.

Figure 3A:
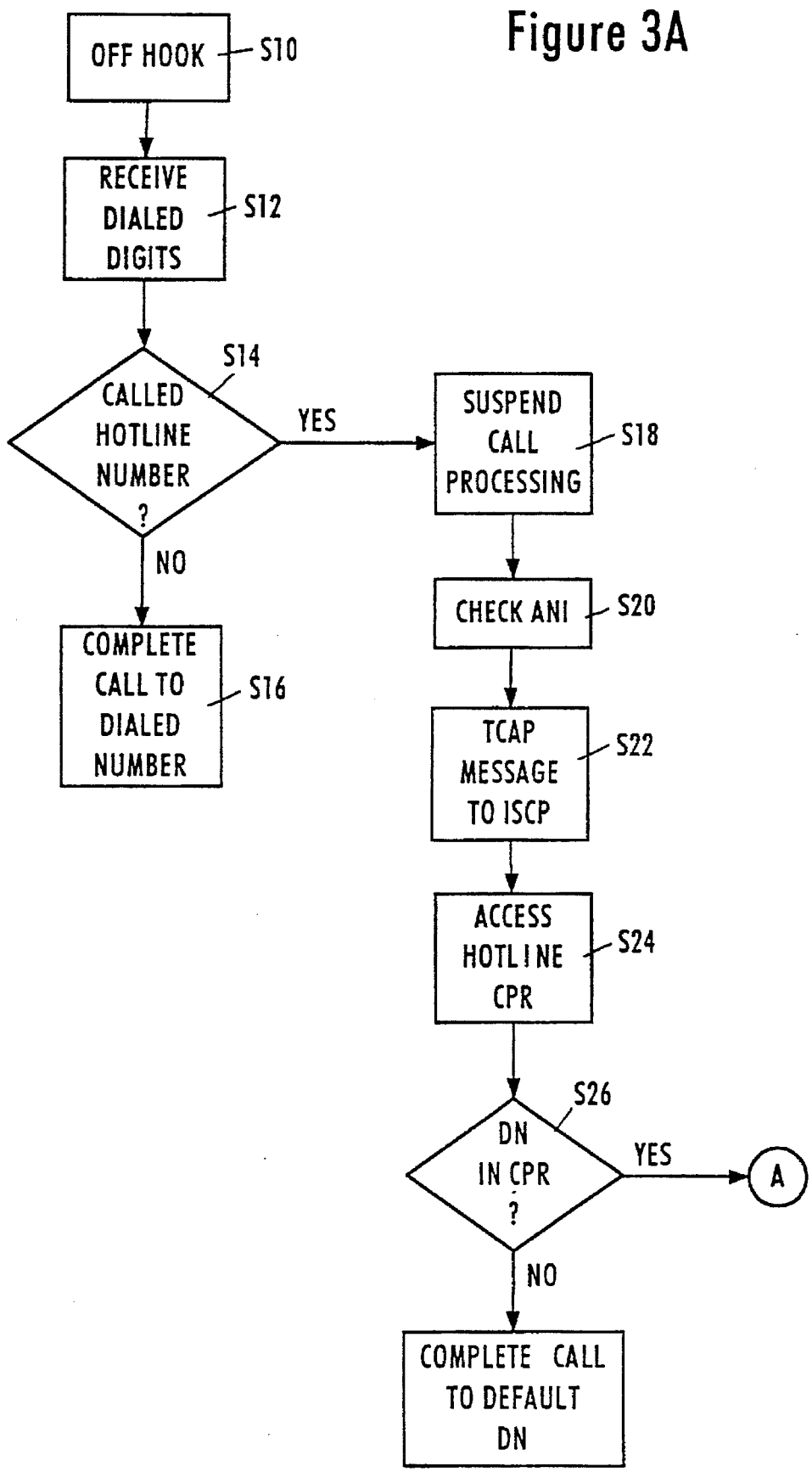
FIGS. 3A–3D are sections of a flow chart showing a routine for a call placed to a subscriber number in accordance with the invention.
Figure 3B:
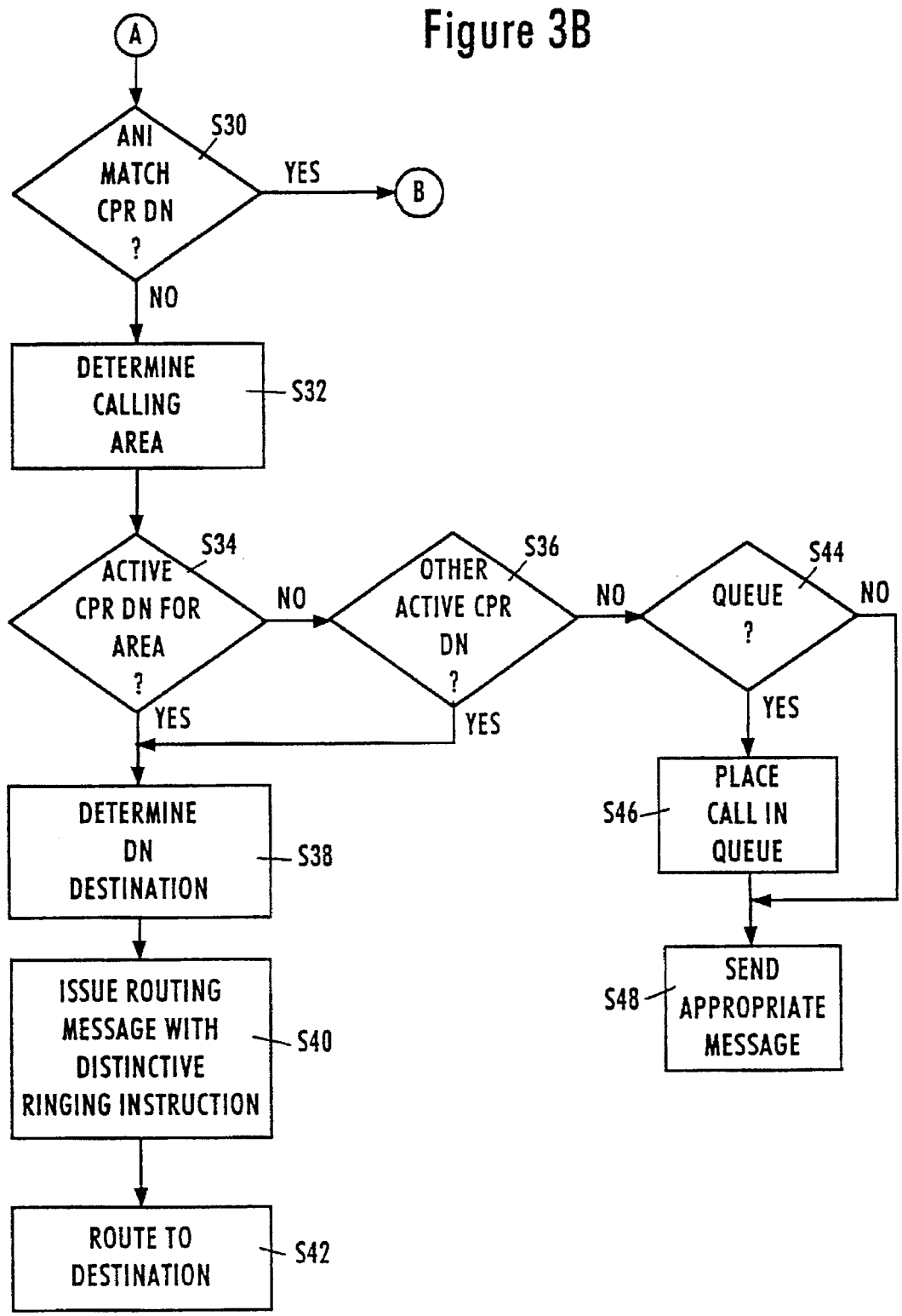

If the calling DN matches a DN stored in the CPR, S30, then it assumed that the caller is a listed administrator or counselor who wishes to change information stored in the CPR. The ISCP then determines whether the call is from a counselor DN listed in the CPR, S50 (FIG. 3B). If so, a counselor message is transmitted, S52, giving the caller the option of being activated or deactivated in the CPR. The caller's response is received, S54, and a determination is made whether the status indicated in the response is different from that currently stored in the CPR, S56. If so, the CPR is updated, S58, and the call terminated, S60. If no change is to be made, the call is terminated. In this embodiment, the ability of a calling counselor to change the information stored in the CPR is limited to activation or deactivation of that single individual DN.

If it is determined at S50 that the calling DN does not match a counselor DN,.then the ISCP treats the call as originating from an administrator and transmits an administrator message. The administrator status is provided with significantly greater CPR modification capability than the counselor status. The administrator is permitted to add or delete counselors in the CPR table and activate and deactivate any administrator or counselor for receiving calls. The administrator message, therefore, will initiate an interactive communication with the caller to obtain the administrator's intended options for change. The particular format of the interaction is subject to variation at the discretion of the user; or course, the information must be provided that identifies the particular items in the CPR listing are to be changed.

Figure 3C:
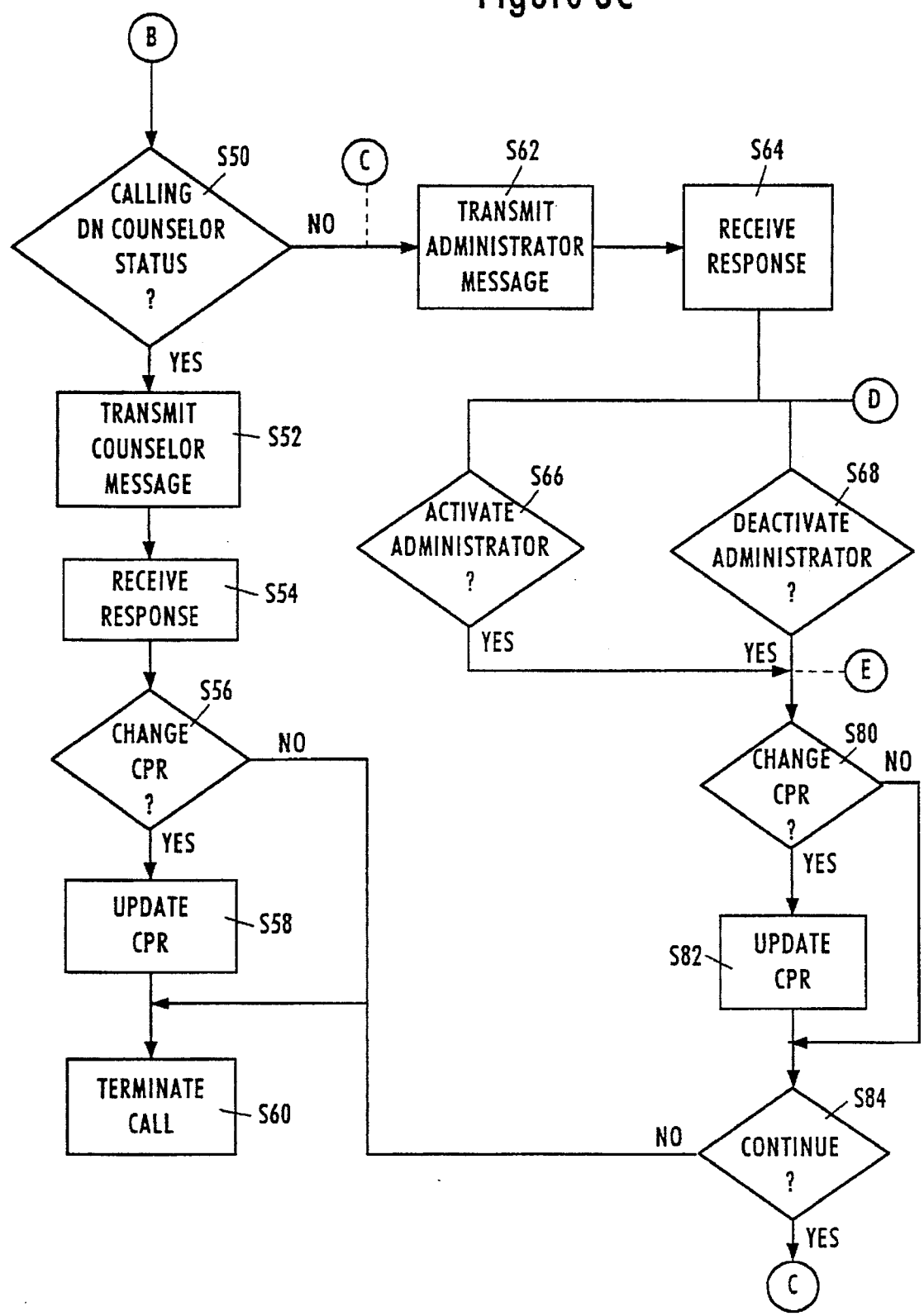
Figure 3D:
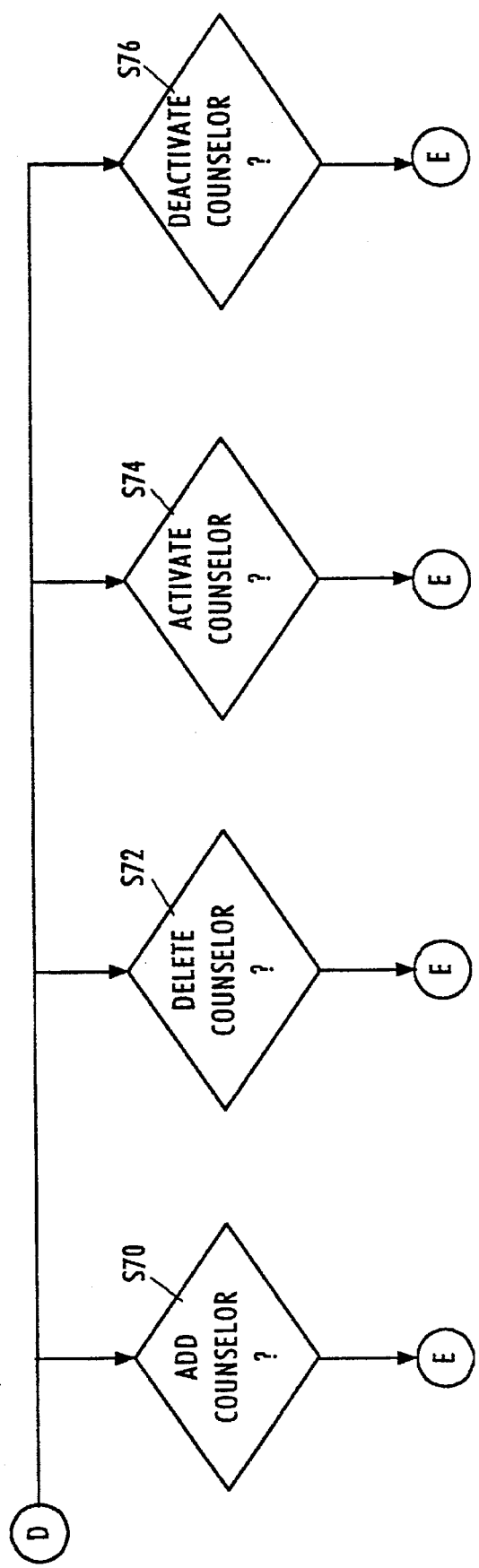

In the embodiment illustrated in FIGS. 3C and 3D, the message is formulated to obtain the information necessary to make a single change at a time. The caller will one of the six options (activate administrator, S66, deactivate administrator, S68, add counselor, S70, delete counselor, S72, activate counselor, S74, and deactivate counselor, S76) and identify the individual in the CPR table. The caller's response is received, S64, and a determination is made of which option was selected, S66–S76. The information result is then compared with the information stored in the CPR, S80, to determine if the selected option is different from the actual information in the CPR. If so, the CPR is updated, S82. After updating, or if no update was found to be necessary, the ISCP determines whether the process should be continued to create further changes to the CPR, S84. Information for this determination may have been obtained with the earlier response or through a subsequent interaction with the caller. If no further changes are to be made, the call is terminated, S60. If additional changes are to be made, the process reverts to step S62 and continues until the administrator has no further changes.

Figure 4:
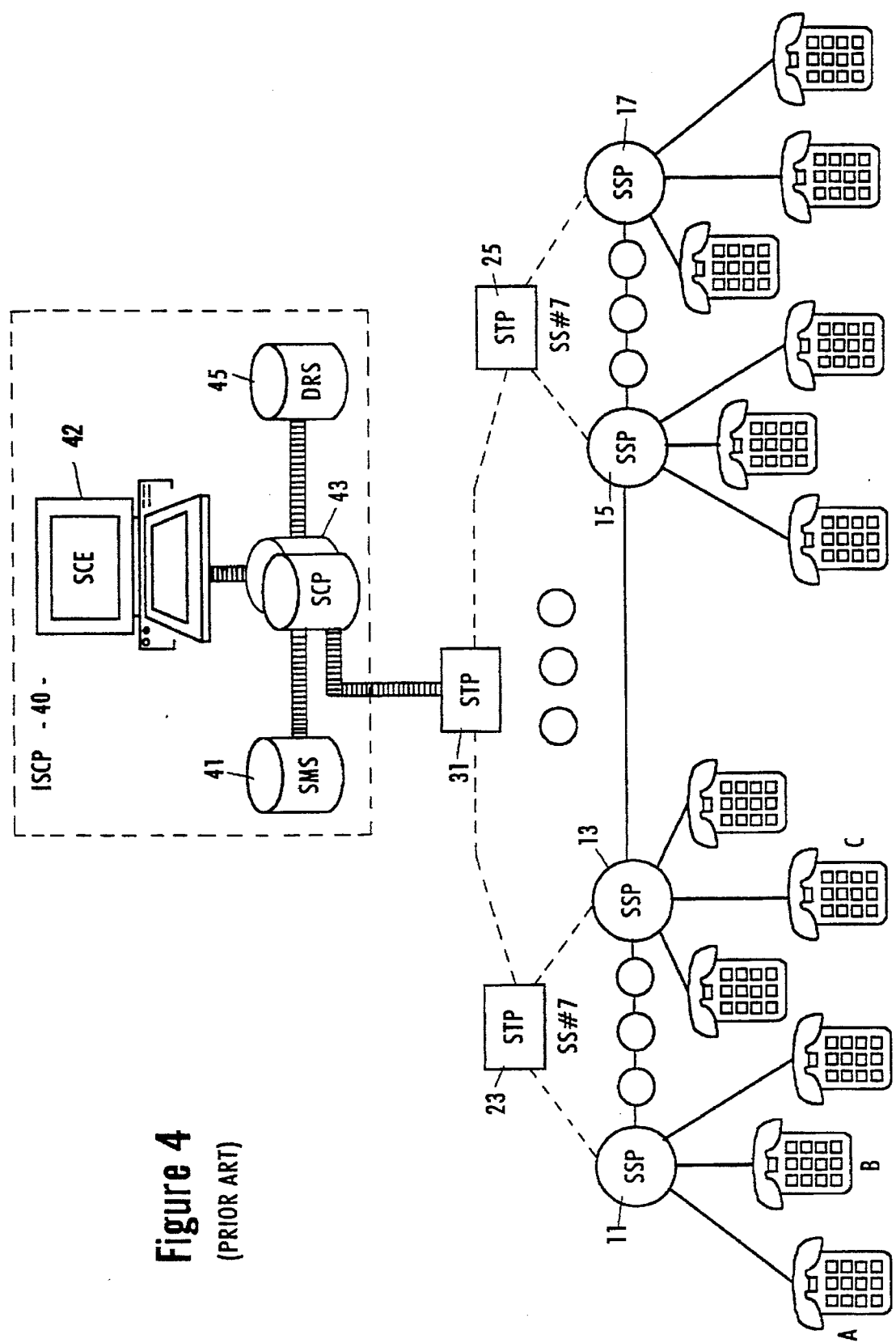
FIG. 4 is an overview of an Advanced Intelligent Network (AIN) suitable for carrying out the invention.

FIG. 4 is a schematic block diagram of the components of AIN system. In this figure, each of the CO's are labeled as an "SSP." The Service Switching Points, referred to as SSP's, are appropriately equipped programmable switches present in the telephone network, which recognize AIN type calls, launch queries to the ISCP and receive commands and data from the ISCP to further process the AIN calls.

SSP's can be programmed to recognize a number of different triggers as an indication that a call is an AIN call. The trigger can relate to the terminating station, but in Area Wide Centrex the trigger is typically the identification of the telephone line from which a call or other request for service originates. Generally, for Area Wide Centrex, a number of lines are designated as members of a business group serviced by the Area Wide Centrex. The SSP's then trigger AIN type servicing based on origination of the call or service request from a line designated as a member of one of the business groups subscribing to Area Wide Centrex.

As shown in FIG. 4, all of the CO's 11, 13, 15 and 17 are equipped and programmed to serve as SSP's. Such central office switching systems typically consist of a programmable digital switch with CCIS communications capabilities. One example of such a switch is a 5ESS type switch manufactured by AT&T; but other vendors, such as Northern Telecom and Seimens, manufacture comparable digital switches which could serve as the SSP's. The illustrated embodiment is perhaps an ideal implementation which would make Area Wide Centrex widely available at the local office level throughout the network. Other implementations provide the SSP functionality only at selected points in the network, and end offices without such functionality forward calls to one of the SSP's.

The Area Wide Centrex implementation of FIG. 4 includes a number of the SSP capable CO switches, such as the SSP's shown at 11, 13, 15, and 17. The SSP type central offices are each at a different location and distributed throughout the area, region or country served by the Area Wide Centrex system.

The SSP's 11 and 24 connect to a first local area STP 23, and the SSP's 15 and 17 connect to a second local area STP 25. The connections to the STP's are for signalling purposes. As indicated by the black dots below STP's 23 and 25, each local area STP can connect to a large number of the SSP's. In FIG. 4, the central offices or SSP's are interconnected to each other by trunk circuits (shown in the drawings as bold lines) for carrying telephone services.

The local area STP's 23 and 25, and any number of other such local area STP's shown as black dots between STP's 23 and 25 communicate with a state or regional STP 31. The state or regional STP 31 in turn provides communications with the ISCP 40. The STP hierarchy can be expanded or contracted to as many levels as needed to serve any size area covered by the Area Wide Centrex and to service any number of stations and central office switches. The lines 23 and 25 between the CO's and the local area STP's are dedicated CCIS links, typically SS#7 type interoffice data communication channels. The local area STP's are in turn connected to each other and to the regional STP 31 via a packet switched network. The regional STP 31 also communicates with the ISCP 40 via a packet switched network.

The messages transmitted between the SSP's and the ISCP are all formatted in accord with the Transaction Capabilities Applications Protocol (TCAP). The TCAP provides standardized formats for various query and response messages. Each query and response includes data fields for a variety of different pieces of information relating to the current call. Of particular note here, an initial TCAP query from the SSP includes, among other data, a "Service Key" which is the calling party's address and digits representing the called party address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" responses for instructing the SSP to play an announcement or to play an announcement and collect digits.

As shown in FIG. 4, the ISCP 40 is an integrated system. Among other system components, the ISCP 40 includes a Service Management System (SMS) 41, a Data and Reporting System (DRS) 45 and the actual data base or Service Control Point (SCP) 43. The ISCP also typically includes a terminal subsystem referred to as a Service Creation Environment or SCE for programming the data base in the SCP 43 for the services subscribed to by each individual business customer.

Each central office switching system normally responds to a service request on a local communication line connected thereto to selectively connect the requesting line to another selected local communication line. The connection can be made locally through only the connected central office switching system. For example, for a call from station A to station B the SSP 11 provides the call connection without any connection to another central office. When the called line connects to a distant station, for example when station A calls station C, the connection is made through the connected central office switching system SSP 11 and at least one other central office switching system SSP 13 through the telephone trunks interconnection the two CO's.

Thus, this invention makes possible the use of a single predetermined telephone number to effect a plan for call completion to a preferred one of multiple destinations, as well as to permit modification, in different degrees, of the plan by authorized callers in accordance with their preset status.

In this disclosure there is shown and described only the preferred embodiment of the invention and but a few examples of its versatility. It is to be understood that the invention is capable of use in various other combinations and environments and is capable of changes or modifications within the scope of the inventive concept as expressed herein. While the invention has been described in terms of a "hotline" scenario, it has utility in various other applications. For example, the system can be used for disseminating information, wherein teachers or experts are the analogues of the counselors in the hotline embodiment.

I claim:

1. A communication system comprising:
   a plurality of subscriber communication lines, each assigned a respective directory number; and
   a switching system for providing selective communication connections between at least two of said subscriber communication lines, said switching system comprising a programmed controller for responding to initiation of a dialed call originated at one of said subscriber communication lines;
   wherein said programmed controller comprises data storage for storing a call processing record for a predetermined directory number, said call processing record containing data related to selected ones of said communication lines; and
   said programmed controller is responsive to a call dialed to said predetermined directory number by a calling party from one of said selected communication lines for which said data is contained in said call processing record to permit change and update of the data stored in said call processing record, and the privileges with which the call processing record may be changed by a calling party from one of 'said selected ones of said communications lines are in said data.

2. A communication system as recited in claim 1, wherein said predetermined directory number is a virtual number.

3. A communication system as recited in claim 1, wherein said switching system is responsive to a call dialed to said predetermined directory number from a subscriber communication line other than one of said selected lines for completing the call to one of said selected lines in accordance with the call processing record.

4. A communication system as recited in claim 3, wherein said call is completed on the basis of geographical location of the subscriber end of said selected lines.

5. A communication system as recited in claim 3, wherein said predetermined directory number is different from the directory numbers assigned to said selected communication lines and said switching system further comprises a ringing circuit for transmitting a distinctive ringing signal when completing said call, said distinctive ringing signal being different from a normal ringing signal transmitted when a call is made to the assigned directory number of a called subscriber line.

6. A communication system as recited in claim 3, wherein said call processing record associates each of said selected subscriber communication lines with a category of change options, the call processing record comprising at least two such categories; and
   said program controller enables said calling party to select from the change options of its associated category.

7. A communication system as recited in claim 6, wherein the change options of a first one of said categories comprises:
   a) adding a subscriber directory number to the call processing record;
   b) deleting any subscriber directory number from the call processing record;
   c) activating any selected subscriber directory number in the call processing record for call completion eligibility;
   d) deactivating any selected subscriber directory number in the call processing record from call completion eligibility.

8. A communication system as recited in claim 7, wherein the change options of a second one of said categories is limited to changing data related to the calling party directory number.

9. In a communication system including at least one switching system connected to a plurality of subscriber lines and connected through a signaling network to a database comprising at least one call processing record assigned to a predetermined directory number, said call processing record containing selected directory numbers, a method of call processing comprising the steps of:
   determining that a call is dialed to said predetermined directory number;
   identifying the directory number of a calling subscriber line;
   comparing the directory number of the calling subscriber line with selected directory numbers in said call processing record;
   in response to a resulting non-match in the comparing step, completing the call in accordance with said call processing record; and
   in response to a matching result in the comparing step, permitting the changing of information contained in said call processing record.

10. A method of call processing as recited in claim 9, wherein said step of completing the call comprises:
    determining which directory numbers contained in said call processing record are in an active status;
    routing the call to one of the active status directory numbers; and
    transmitting a distinctive ringing signal to the routed directory number destination.

11. A method of call processing as recited in claim 10, wherein the call is routed on the basis of geographical location of the subscriber end of a calling subscriber line.

12. A method of call processing as recited in claim 9, wherein said call processing record relates each contained selected directory number to one of a plurality of categories, and said step of permitting the changing of information comprises:
    determining the category in the call processing record that corresponds to the calling subscriber line;
    transmitting to the calling subscriber line an interactive option menu associated with the determined category;

receiving from the calling subscriber line at least one response to said interactive option menu; and changing the information contained in said call processing record in accordance with said response.

13. A method of call processing as recited in claim 12, wherein the interactive option menu for a first category contains at least one option to change information with respect to any of the directory numbers in the call processing record and the interactive option menu for a second category is limited to information in the call processing record related to the calling subscriber line.

14. A method of call processing as recited in claim 13, wherein the first category menu options comprise adding or deleting directory numbers to the call processing record, and activating or deactivating directory numbers in the call processing record for call completion eligibility.

15. In a switched telephone network system for completing calls to a plurality of subscriber lines with transmission of ringing signals, the subscriber lines assigned respective directory numbers, a method of call processing comprising the steps of:

routing a call dialed to a predetermined directory number to a selected subscriber line destination that is not assigned the predetermined directory number, said predetermined directory number is a virtual number associated with a plurality of destination directory numbers, one of which is associated with said selected subscriber line destination;

transmitting a distinctive ringing signal to said destination that is different from the ringing signal transmitted in a call dialed to the directory number of the subscriber line destination;

identifying the subscriber line that initiated the call;

temporarily suspending the call;

accessing a database for routing information; and switching the call for completion in accordance with the routing information, wherein said routing step further comprises the steps of comparing the directory number of the calling subscriber line with destination directory numbers in the database and completing the call if there is no match in the comparing step.

16. A method as recited in claim 15, further comprising permitting the changing of information in the database in response to a match in the comparing step.

17. In a telephone communication system including at least one central office switching system connected to a plurality of subscriber lines each having an assigned directory number, a voice network portion comprising voice communication paths for interconnecting at least two of the subscriber lines, a common channel signaling network portion comprising signaling paths interconnecting said central office switching system through at least one signal transfer point and at least one integrated services control point including a data base, a method of call redirection processing with distinctive ringing on a per call basis comprising the steps of:

storing call redirection information in a call processing record in said data base for a predetermined directory number;

setting a trigger at a switching service point for accessing said data base in response to a call dialed to said predetermined directory number from an originating subscriber line;

in response to said trigger being activated, establishing a voice communication path between said originating subscriber line and a subscriber line destination having a directory number associated with the call processing record redirection information; and transmitting a distinctive ringing signal to the destination subscriber line that is different from the ringing signal transmitted in calls dialed to the destination subscriber line directory number.

18. A method as recited in claim 17, wherein said distinctive ringing signal is generated by said central office switching system in response to a signaling message received from a signaling path from said integrated services control point via said common channel signaling network portion.

19. A method as recited in claim 17, wherein said step of routing comprises:

accessing said data base;

comparing the originating subscriber line directory number to directory numbers stored in the call processing record;

in the absence of a match in comparing step, completing the call to one of the directory numbers stored in the call processing record.

20. A method as recited in claim 19, further comprising permitting the changing of information in the call processing record in response to a match in the comparing step.

21. A method as recited in claim 20, wherein said changing step comprises:

transmitting to the originating subscriber line an interactive option menu associated with the directory number of said originating subscriber line in the call processing record; and updating the call processing record in accordance with information provided from said originating subscriber line.

22. A method as recited in claim 21, wherein said call processing record contains at least two categories of interactive option menus that represent different modification privileges for modifying call processing record information.

23. A method as recited in claim 22, wherein a first category provides options only for changing call processing record information about the originating subscriber line directory number and a second category provides administrative options for changing call processing record information for about a plurality of subscriber line directory numbers.

* * * * *